United States Patent [19]

Shu

[11] Patent Number: 4,810,732
[45] Date of Patent: Mar. 7, 1989

[54] AMINO RESIN MODIFIED POLYMER GELS FOR PERMEABILITY CONTROL

[75] Inventor: Paul Shu, Princeton Junction, N.J.

[73] Assignee: Mobil Oil Corporation, New York, N.Y.

[21] Appl. No.: 99,805

[22] Filed: Sep. 22, 1987

Related U.S. Application Data

[62] Division of Ser. No. 922,916, Oct. 24, 1986, Pat. No. 4,716,966.

[51] Int. Cl.$^4$ .................... E21B 33/138; E21B 43/12; E21B 43/22
[52] U.S. Cl. ................................. 523/130; 252/8.554
[58] Field of Search ............... 166/294, 295, 246, 270; 252/8.551, 8.554; 523/130

[56] References Cited

U.S. PATENT DOCUMENTS

| | | | |
|---|---|---|---|
| 3,908,760 | 9/1975 | Clampitt et al. | 166/246 |
| 3,918,521 | 11/1975 | Snavely et al. | 166/272 |
| 4,018,286 | 4/1977 | Gall et al. | 166/294 X |
| 4,157,322 | 6/1979 | Colegrove | 523/130 |
| 4,210,206 | 7/1980 | Ely et al. | 166/294 |
| 4,461,351 | 7/1984 | Falk | 166/295 |
| 4,613,631 | 9/1986 | Espenscheid | 166/246 X |
| 4,673,038 | 6/1987 | Sandiford et al. | 166/294 X |

Primary Examiner—Herbert B. Guynn
Attorney, Agent, or Firm—Alexander J. McKillop; Charles J. Speciale; Charles A. Malone

[57] ABSTRACT

A composition of matter wherein amino resins such as melamine formaldehyde ("MF") resins modify polysaccharide polymers thereby forming gels with transitional metal ions useful for profile control where said polymers have amine, amide, hydroxyl and thiol funmctionalities. Said gels are thermally stable, brine tolerant and rehealable. Said resin modified polysaccharide polymers can be used in their liquid or ungelled state as a mobility control agent in a reservoir during the removal of hydrocarbonaceous fluids therefrom.

8 Claims, No Drawings

AMINO RESIN MODIFIED POLYMER GELS FOR PERMEABILITY CONTROL

This application is a division of application Ser. No. 922,916 filed on Oct. 24, 1986 now U.S. Pat. No. 4,716,966.

FIELD OF THE INVENTION

This invention relates to novel gels resultant from chromium crosslinking of melamine formaldehyde and other amino resins stabilized xanthan polymers and other polysaccharide polymers containing hydroxyl, amino, amide, and thiol functionalities. Resultant gels are useful as profile control agents for high temperature reservoirs.

BACKGROUND OF THE INVENTION

One of the major problems encountered in the waterflooding of permeability-stratified reservoirs is the preferential flow of water through the more permeable zones between injector and producer wells. This preferential flow greatly reduces the sweep efficiency of driving fluids. This reduction in sweep efficiency can also occur in steam and miscible $CO_2$-flooding processes.

To improve sweep efficiency, the permeability of such zones must be reduced. This technique is commonly known as permeability profile control. Methods for plugging off, diverting, or reducing the rate of undesired fluid movement in porous media make up a substantial amount of the technology, including placing gels in the formation. Such gels are used to plug highly permeable zones in the formation, thus diverting the water or other fluid through the less permeable zones, thereby improving sweep efficiency and providing greater oil recovery. These prior art gels degrade when sheared, as during the pumping operation through pipes, perforations, and the permeable zones in the formation, resulting in the breakdown of gel structures and the loss of gel's ability to plug and maintain impermeability. Therefore, they cannot be prepared on the surface and then pumped underground into the formations. Instead, the gellation must be done "in situ" within the formation. Polysaccharide biopolymers, such as xanthan gum, cellulose derivatives, guar gum, etc., are useful for reservoir permeability profile control in the crosslinked gel-forms. Chromium crosslinked xanthan gum has been successfully used in many fields to recover incremental oil. Cr-xanthan gel has many unique features such as brine tolerance, shear stability, shear thinning, and rehealing of the sheared gel. An important advantage of the Cr-xanthan gel which derives from these shear properties is that it can be prepared on the surface and then pumped underground into the formations. A major deficiency of Cr-xanthan and other biopolymers is their low thermal stability. Xanthan gum application is limited to wells with temperatures under 150° F. However, there are many reservoirs with higher temperatures. Thermal stability of xanthan gum must be improved in order for these materials to be used to treat reservoirs having high temperatures.

It has been found that amino-resins can react with xanthan gum to result in either gelled or solution form to produce a more thermally stable material. Further reaction with chromium or other metals produces thermally stable, brine tolerant, shear thinning, rehealable gels suitable for high temperature reservoir uses.

SUMMARY OF THE INVENTION

This invention is directed to a composition of matter and process comprising transitional metal crosslinked (eg. Cr, Al, Zr, etc.) aminoplast resin reacted xanthan polymer and other biopolymers, cellulose, cellulose derivatives, and other polysaccharide, polymers having at least one functional group selected from a member of the group consisting of an amine, an amide, a carboxyl, a hydroxyl, or a thiol. The amino resin-polysaccharide polymer reaction does not require a catalyst or a particular pH requirement for the preparation of said composition of matter.

Said metal crosslinking of said aminoplast resin reacted polymers forms a more thermally stable gel which is useful in producing hydrocarbonaceous fluids from a reservoir containing same and greatly improves the sweep efficiency of driving fluids. Sweep efficiencies are also improved in water flood, steam flood, and miscible carbon dioxide flood processes.

It is therefore an object of this invention to provide for economical aminoplast resins which improve the thermal stability of polysaccharide polymers or biopolymers, particularly xanthan polymers, known to be useful for profile control.

It is another object of this invention to improve the thermal stability of polysaccharide biopolymer-metal complexed gel reactions by utilizing amino-resins, especially melamine-formaldehyde resins.

It is a yet further object of this invention to provide for a substantially stable gel when high temperatures are encountered in a reservoir.

It is a still yet further object of this invention to provide for a gelation reaction which will proceed in a saline hydrocarbonaceous reservoir environment.

It is yet another object of this invention to provide a rehealable gel.

DESCRIPTION OF THE PREFERRED EMBODIMENTS

In the practice of this invention, a melamine formaldehyde ("MF") resin is formed as a reaction product of melamine and formaldehyde. Said resin is known as an aminoplast or amino resin which comprises a class of thermosetting resins made by the reaction of an amine with an aldehyde. The resultant resin is reacted with a polysaccharide polymer, particularly a xanthan polymer, in an aqueous medium where said polymer has at least one functional group selected from a member of the group consisting of an amine, an amide, a hydroxyl, or a thiol group. Said polysaccharide polymer includes among others, cellulose, cellulose derivatives, and biopolymers such as xanthan polymers. This reaction can be carried out at ambient conditions, and also under conditions occurring in a subterranean hydrocarbonaceous formation or reservoir in substantially all pH conditions, however a pH of 10 or less is preferred. The material resultant from said reaction can be a gel or a solution which is then crosslinked with a transitional metal such as Cr, Al, Zr, to produce a gel useful to recover hydrocarbonaceous fluids from a formation containing same.

These gels are novel in that they are unaffected by high saline conditions up to about 23 wt. % brine solution, even when said brines contain divalent cations such as Ca(II) and Mg (II), often encountered in said formations. High temperatures encountered in said formations up to about 195° F. do not adversely affect said gels. Said gels can be injected into a formation where said gels "shear" during the injection process and later "reheal" under formation conditions. Gels resultant from said procedure are more thermally stable than the ones without amino resin treatment. A method for making a kindred gel without metals is discussed in U.S. Pat. No. 4,157,322 which issued to Colegrove on June 5, 1979. This patent is hereby incorporated by reference.

Polysaccharide polymers including biopolymers, preferably xanthan polymers, having functional groups such as $NH_2$, $—CONH_2$, COOH, —OH, —SH can react with MF resins. One acceptable xanthan biopolymer is Flocon ®4800. This biopolymer can be purchased from Pfizer Inc. Chemicals Div., 235 E. 42nd St., New York, NY 10017. Polymer concentrations range from about 0.1 to about 5.0 wt. percent, preferably about 0.2–3.0 wt. percent. Melamine formaldehyde resin derived as a reaction product of melamine and formaldehyde has a molar ratio of between 1–6. A ratio between 3–6 is commonly used. The methylol group, $—CH_2OH$ is reactive to various functional groups such as $NH_2$, $—CONH_2$, —OH, —SH and can also self-condense to form cured resins. MF resins are often methylated fully or partially to modify their reactivity and solubility. All above mentioned aminoresin varieties are useful in this invention. Its preparation is convenient and well documented in preparative polymer manuals.

The MF resin that is utilized in this invention can be a commercial product. Included among these melamine-formaldehyde (melamine) resins which are useful in this invention are the partially methylated resins and the hexamethoxymethyl resins (i.e. American Cyanamid's Cymel ™ 373, Cymel 370, Cymel 380 and Parez ® resins). The resin, however, has to be one that is soluble or dispersible in an aqueous medium. Other amino resins can also be used. Non-limiting examples of resins which can be used are urea-formaldehyde, ethylene and propylene urea formaldehyde, triazone, uron, and glyoxal resins. The amount of MF resins required for polymer modification is in the ratio of 0.1:1 to about 10:1 polymer to amino resins.

The resulting MF reacted xanthan polymer is called MFX polymer. MFX with high aminoresin ratio are more thermally stable and form gels of higher gel strength. The optimum has to be determined by the field conditions. At high MF/Xanthan ratio, gel may form without Cr crosslinking. This situation should not affect the final gel preparation by Cr or other transitional metal crosslinking.

Final gels resultant from the Cr gelation reaction could be formed in strong brines up to about 23 wt.% brine solution which may contain at least about 1500 ppm Ca(II) and 500 ppm Mg(II). Such gels are rehealable after being sheared. The amount of Cr used is about 1–10 wt. % based on xanthan polymer. Other transition metals can also be used. Nonlimiting examples are Al and Zr. Said formed gels were stable as determined by sustained gel integrity and low gel shrinkage at 195° F. for at least three months. Examples of preferred gel compositions are set forth below. Therefore, the thermal stability of Cr-MFX gel is at least 45° F. higher than Cr-xanthan gels used in prior arts.

In the preparation of these novel melamine formaldehyde xanthan ("MFX"), Cyanamid's Parez melamine-formaldehyde resin, and Pfizer's Flocon 4800 xanthan polymer were utilized. The melamine formaldehyde resin and xanthan polymer were mixed in an aqueous solution sufficient to make the desired MFX polymer. These aqueous solutions can comprise fresh water, field brine, sea water, or synthetic brine. Gel forms in about 0.25 of an hour to about 4 hours after the addition of a transitional metal to MFX, preferably Cr (III). The preferred ratio of xanthan to amino-resin is in the range of about 0.1:1 to about 10:1. Ratio of xanthan to transitional metal, preferably Cr, is from about 10:1 to about 100:1.

A concentrated brine solution was utilized to demonstrate the brine tolerance of MFX polymer and its gelled composition. Said brine solution also contained 21.6% (w/v) of total dissolved solids, and comprises a composition as stated below:

| NaCl | 154.32 g per liter |
|---|---|
| KCl | 0.3 |
| $MgCl_2.6H_2O$ | 16.3 |
| $CaCl_2.2H_2O$ | 44.38 |
| $BaCl_2.2H_2O$ | 0.22 |

EXAMPLES (1) The following six MFX samples were prepared with the composition shown:

| MFX No. | Xanthan (ppm) | Melamine Formaldehyde Resin (ppm) |
|---|---|---|
| 1 | 5000 | 2000 |
| 2 | 5000 | 1000 |
| 3 | 5000 | 500 |
| 4 | 2500 | 4000 |
| 5 | 2500 | 2000 |
| 6 | 2500 | 1000 |

Xanthan prepared by different manufacturers and different batches from the same manufacturer may vary. The amount of MF resin used should be determined by experiment.

(2) Thermal stability of MFX polymer

MFX-6 and a 2500 ppm xanthan in brine were stored at 195° F. for one week. While the MFX-6 sample retained 90% of its viscosity, the xanthan sample decomposed to form preciptates.

(3) Shear stability and shear thinning property of MFX polymer

| Viscosity Unsheared MFX-6 (cp) | Viscosity Sheared* MFX-6 (cp) | Measured @ Shear Rate ($sec^{-1}$) |
|---|---|---|
| 46.4 | 45 | 46 |
| 76.2 | 75.8 | 23 |
| 128 | 127 | 11.5 |
| 220 | 200.4 | 5.75 |

*Sheared with a Waring blender for 30 sec. at 20,000 rpm.

The shear stability of MFX-6 is demonstrated by the equivalence in the viscosities of the sheared and unsheared samples over a range of shear rates. The shear thinning property of MFX polymer is shown by the progressingly lower viscosity reading at higher rates and vice versa.

(4) Gelation with Cr(III)

Within four hours after addition of 45 ppm Cr(III) nitrate, all samples (MFX 1–6) formed gels at room temperature.

(5) MFX-Cr gel, thermal stability

Gels prepared in Example 4 were stored at 195° F. for one week. MFX 1-3 showed no sign of gel shrinkage and decomposition. MFX 4-6 showed 10-20% gel shrinkage and no sign of degradation. The controls (2500 ppm and 5000 ppm xanthan with 45 ppm Cr) showed 50% gel shrinkage and indication of degradation.

(6) Rehealability of sheared MFX-Cr gels

MFX-3 and MFX-6 were gelled with 45 ppm Cr(III) as described in Example 4. These materials were then sheared at 20,000 rpm for 30 sec in a Waring blender and allowed to reheal for 1.5 hours. The thermal stability of sheared/rehealed gels can be demonstrated by a comparison with two control xanthan-Cr gels also sheared and rehealed after one week at 195° F.

|  | MFX-3 | MFX-6 | Control 1 | Control 2 |
|---|---|---|---|---|
| Degree of syneresis at 1 week, % | 0 | 30 | 20 | 50 |

Control 1 = 5000 ppm xanthan/45 ppm Cr.
Control 2 = 2500 ppm xanthan/45 ppm Cr.

From the examples above, it is demonstrated that xanthan polymer's thermal stability has been substantially improved by reacting xanthan with amino-resins, especially melamine-formaldehyde resin even at amino-resin concentrations that are too low to gel the xanthan. This reaction with amino-resins does not alter the favorable properties of xanthan, such as shear stability, brine tolerance, shear thinning and gel forming with metals. Cr complexed xanthan gel when used for stratification control is thermally stable up to about 150° F. Metal complexed (Cr) melamine formaldehyde xanthan (MFX) gels are at least 45° F. more stable than xanthan-Cr gels. Furthermore, MFX-Cr gels retain the unique rehealing property of xanthan-Cr gels. Rehealing is an important property which allows the preformed gel to experience mechanical shear (i.e., to be injected into target zones) and then "reheal" to regain its gel structure.

Metallic ions which can be used to crosslink the MFX polymers in solution include zirconium, chromium, antimony and aluminum. The concentration of these transitional metals in said polymer solutions will of course vary depending upon the requirements for the particular application being used and the nature of the formation into which the crosslinked MFX gel is placed. In any event, said metal should be in an amount sufficient to obtain the desired gelling effect. Although the exact amount of the metal required will vary depending on the particular application, it is anticipated that the metals should be included within the gel in amounts of from about 1 wt. % to about 10 wt. % based on xanthan.

Where it is desired to obtain increased sweep efficiency, gels of this invention can be used to plug a previously swept portion of a formation. Said gels can be directed to areas of increased porosity by utilization in any of the below methods.

One method where gels of this invention can be utilized is during a waterflooding process for the recovery of oil from a subterranean formation. U.S. Pat. No. 4,479,894, issued to Chen et al., describes one such process. This patent is hereby incorporated by reference in its entirety. U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. This patent is hereby incorporated by reference.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a miscible carbon dioxide drive in an oil recovery process to obtain greater sweep efficiency. A suitable process is described in U.S. Pat. No. 4,565,249 which issued to Pebdani et al. This patent is hereby incorporated by reference in its entirety. Increased sweep efficiency can be obtained when the subject gels are used in a carbon dioxide process by lowering the carbon dioxide minimum miscibility pressure ("MMP") and recovering oil. Carbon dioxide MMP in an oil recovery process is described in U.S. Pat. No. 4,513,821 issued to Shu which is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. An aqueous cross-linked gel formed by a polysaccharide polymer, an aminoplast resin, and transitional metal ions comprising:
   (a) water;
   (b) about 0.2 to about 5.0 wt. percent of a cross-linkable polysaccharide polymer selected from the group consisting of polysaccharide biopolymers and cellulose derivatives having at least one functional group selected from a member of the group consisting of an amine, an amide, a hydroxyl, or a thiol group;
   (c) about 0.02 to about 5.0 wt. percent of an aminoplast resin which reinforces said polymer; and
   (d) sufficient transitional metal ions to form a gel of a size and strength sufficient to close one or more permeable zones in a formation under substantially all pH conditions.

2. The gel as recited in claim 1 wherein said resin is a member selected from the group consisting of melamine-formaldehyde, urea-formaldehyde, ethylene urea formaldehyde, propylene urea formaldehyde, triazone, uron and glyoxal.

3. The gel as recited in claim 1 where said polymer is a member selected from the group consisting of cellulose derivatives and xanthan polymers.

4. The gel as recited in claim 1 wherein the ratio of polymer to aminoplast resin required for gelation is from about 0.1:1 to about 10:1.

5. The gel as recited in claim 1 where said gel forms under salinity concentrations encountered in an oil reservoir.

6. The gel as recited in claim 1 where said gel is of substantial stability and is able to withstand high temperatures encountered in an oil reservoir for at least three months.

7. The gel as recited in claim 1 where said resin can condense to form a cured resin.

8. The gel as recited in claim 1 where said gel is rehealable.

* * * * *